G. E. MOLYNEUX.
SPEED GOVERNED STOPPING MECHANISM.
APPLICATION FILED MAR. 11, 1916.

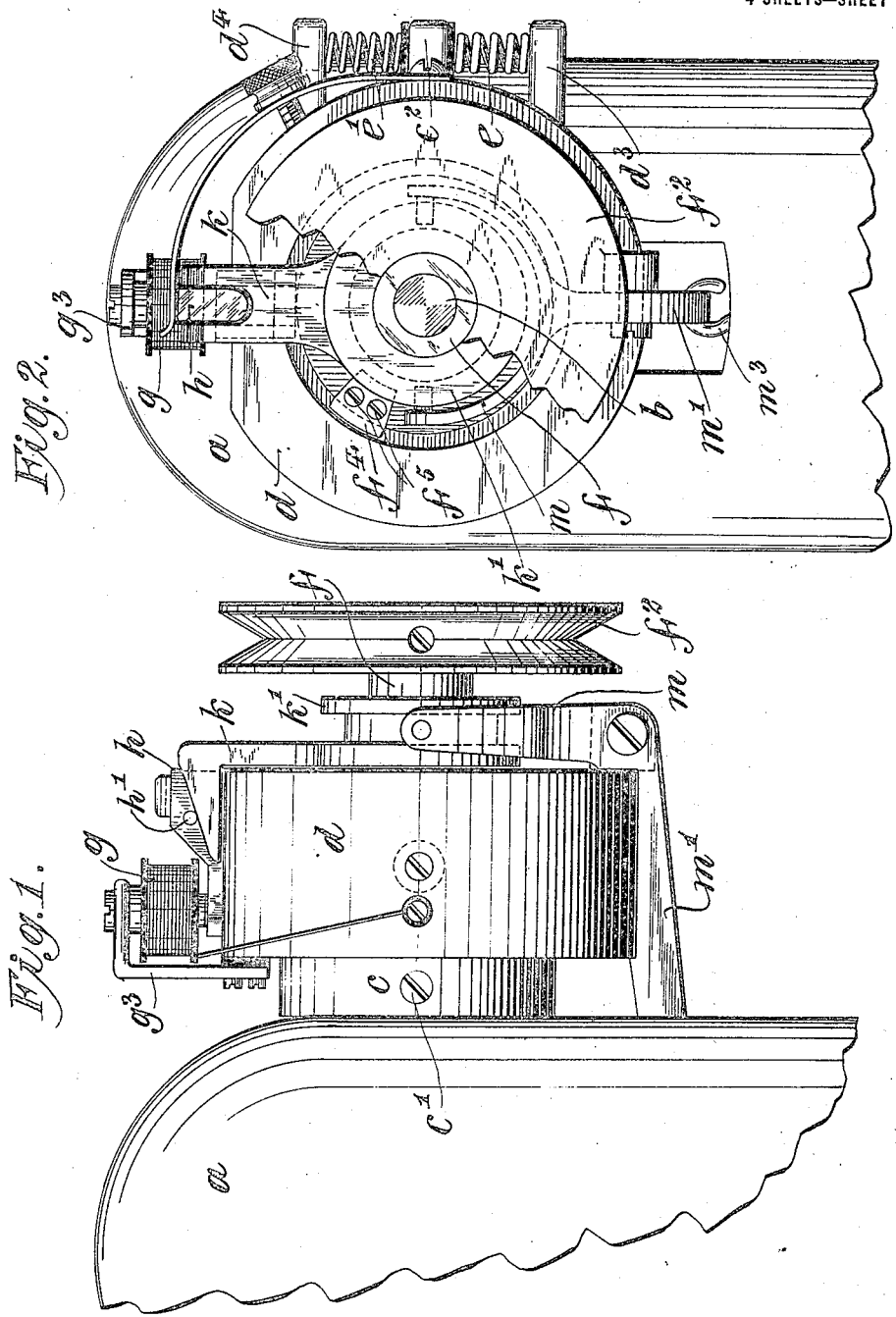

1,258,927.

Patented Mar. 12, 1918.
4 SHEETS—SHEET 2.

WITNESS

INVENTOR
George E. Molyneux
BY
Redding, Greeley & Goodlett
ATTORNEYS

G. E. MOLYNEUX.
SPEED GOVERNED STOPPING MECHANISM.
APPLICATION FILED MAR. 11, 1916.
1,258,927.
Patented Mar. 12, 1918.
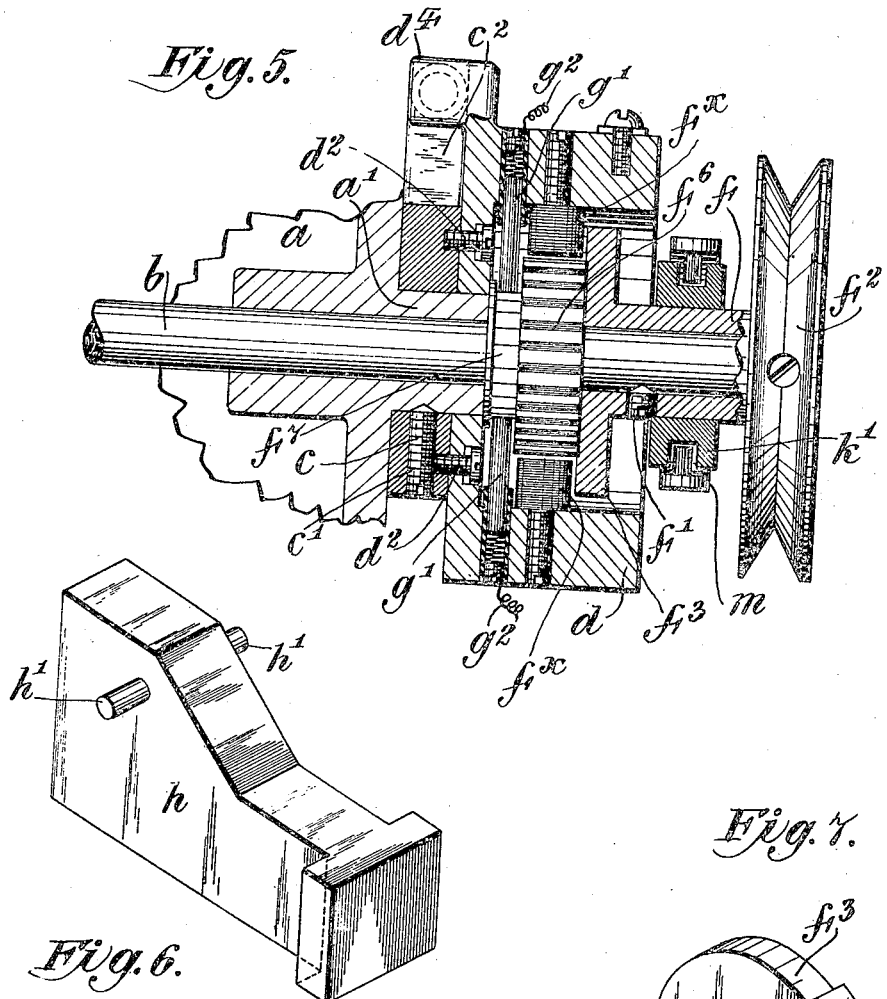
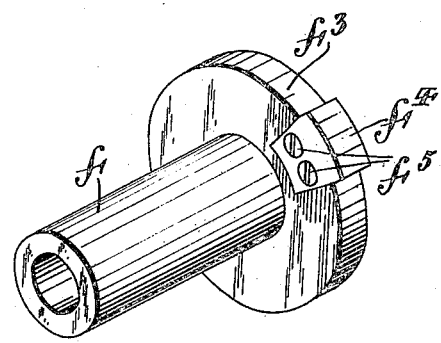

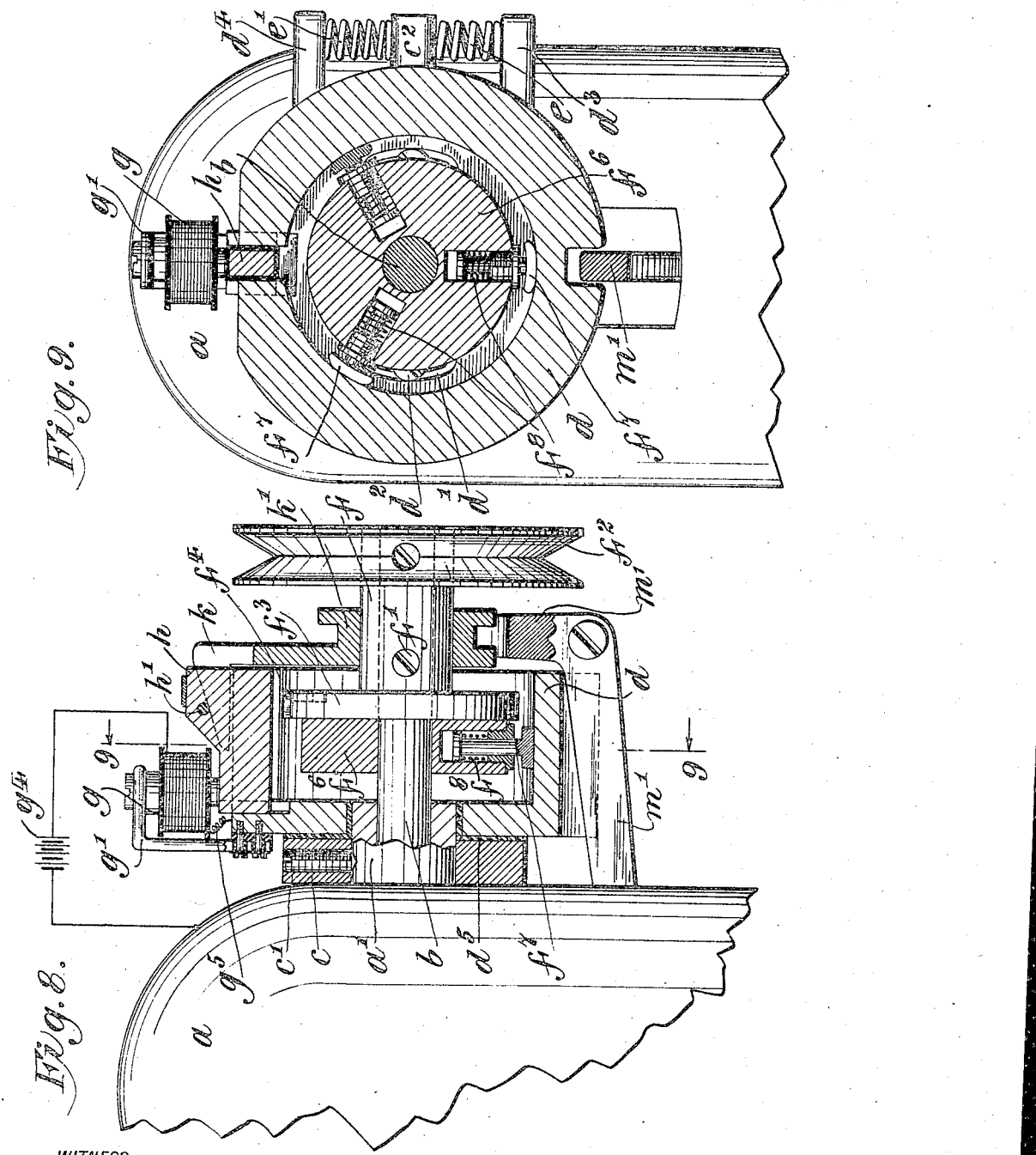

UNITED STATES PATENT OFFICE.

GEORGE E. MOLYNEUX, OF BAYONNE, NEW JERSEY.

SPEED-GOVERNED STOPPING MECHANISM.

1,258,927.　　　　　Specification of Letters Patent.　　Patented Mar. 12, 1918.

Application filed March 11, 1916.　Serial No. 83,605.

*To all whom it may concern:*

Be it known that I, GEORGE E. MOLYNEUX, a citizen of the United States, and residing in the city of Bayonne, county of Hudson, in the State of New Jersey, have invented certain new and useful Improvements in Speed-Governed Stopping Mechanisms, of which the following is a specification, reference being had to the accompanying drawings, forming a part hereof.

This invention relates to mechanisms for arresting quickly, but without shock or jar or undue wear, the motion of high speed machines, such as high speed sewing-machines. Many different forms of such mechanism have been devised heretofore, most of them depending upon the mechanical action of a body which is movable radially and is subject to centrifugal action to permit or prevent the operation of the stopping devices, such movable body being held by centrifugal action in its extreme position, to prevent the operation of the stopping devices when the shaft to which it is applied is rotating at a speed too high to permit the stopping devices to operate without danger of breakage, and being permitted to move under the influence of some external force to permit or bring about the operation of the stopping devices when the speed of the machine falls below the predetermined speed at which the stopping devices may operate with safety. The object of this invention is to produce a stopping mechanism of this general character which shall not be dependent on the mechanical action of a centrifugal body upon the stopping devices and in accordance with the invention provision is made whereby the speed of the machine is made to control the electrical condition of electromagnetic devices by which the operation of the stopping devices is controlled. In one form of the invention there is combined with the rotating mechanism an electric generator by which, at high speeds, sufficient current is generated to cause electromagnetic devices to maintain the stopping devices in inoperative position, while at low speeds insufficient current is generated to bring about such result. In another embodiment of the invention provision is made whereby an external source of electric energy is governed by a contact maker which is subject to centrifugal action. The invention will be more fully explained hereinafter with reference to the accompanying drawings in which it is illustrated as embodied in stopping mechanism for sewing-machines, and in which,—

Figure 1 is a view in front elevation showing a portion of the arm of a sewing-machine with one form of the improved stopping mechanism, in which the generator is embodied, applied thereto.

Fig. 2 is a view of the same in end elevation, as seen from the right hand in Fig. 1, with a portion of the driving pulley broken away to disclose the parts beyond it.

Fig. 5 is a partial view similar to Fig. 3, but in section, on a horizontal plane and with the parts in their driving relation and the stopping devices out of operation.

Fig. 6 is a view in perspective of the radially movable block which carries a stop-lug for coöperation with a rotating stop-lug.

Fig. 7 is a perspective view of the rotating member of the stopping devices.

Fig. 8 is a view similar to Fig. 3, but showing a different embodiment of the invention, in which an external source of electric energy is indicated.

Fig. 9 is a view in section on the plane indicated by the line 9—9 of Fig. 8, looking in the direction of the arrow.

Figure 4:
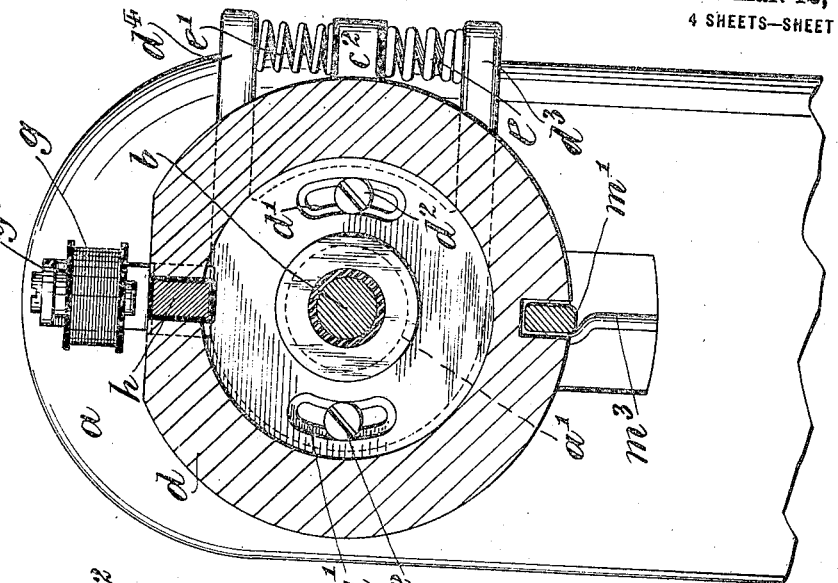
Fig. 4 is a view in section on the plane indicated by the line 4—4 of Fig. 3, looking in the direction of the arrow.
Figure 3:
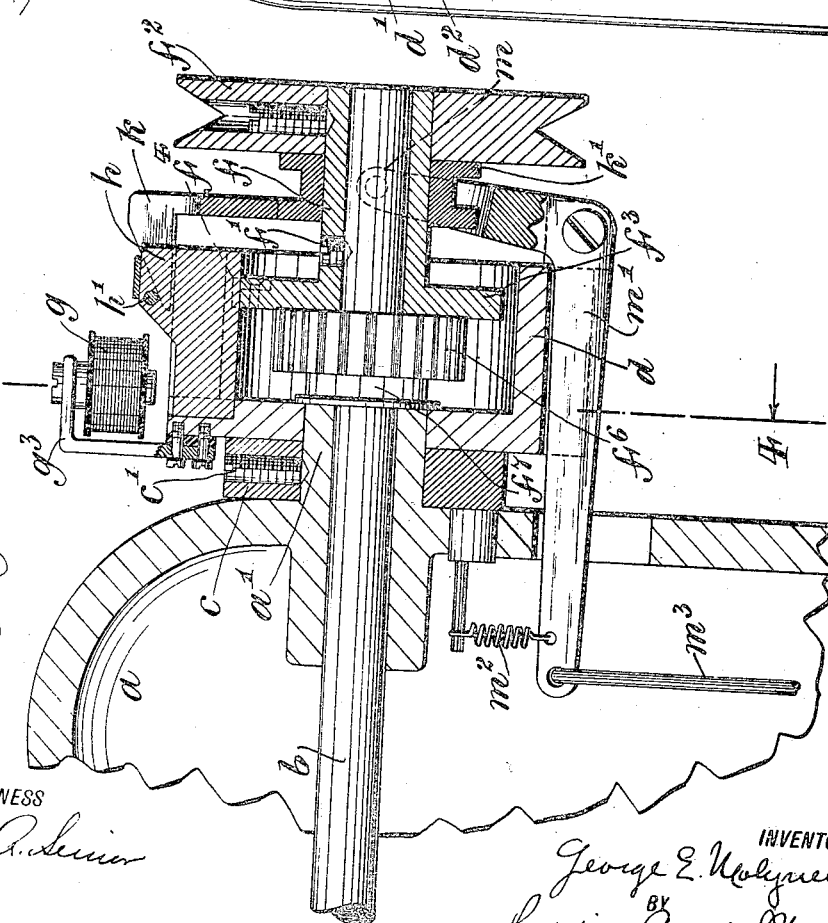
Fig. 3 is a view of the same parts in longitudinal section, in the stopping position.

The improved stopping mechanism is shown in the drawings as applied directly to the arm $a$ of a sewing-machine, the arm having a hub $a'$ which furnishes a bearing for the usual shaft $b$ and also serves, in conjunction with the shaft, as a support for the stopping mechanism, which may be made up as a unit complete in itself and applied directly to the sewing-machine.

There is secured rigidly to the hub $a'$, as by means of a set screw $c'$, a ring $c$ which is provided at a suitable point with a radial lug $c^2$. To the ring $c$ is secured frictionally, and so as to be capable of a limited rotary movement, a shell $d$, the head of which is provided with arc-shaped slots $d'$ through which, as shown in Figs. 4 and 5, headed screws $d^2$ are passed into the ring $c$, so as to hold the shell frictionally against the fixed ring $c$ with a capacity for rotary movement limited by the slots $d'$. The shell $d$ is provided with abutments $d^3$ and $d^4$ between which stands the radial lug $c^2$ of the fixed ring $c$. A relatively heavy spring $e$ is interposed between the radial lug $c^2$ and the abutment $d^3$ to cushion the stopping mechanism and a relatively lighter spring $e'$ is interposed between the radial lug $c^2$ and the abutment $d^4$ to cushion the recoil.

In place of the usual hand wheel and driving pulley there is secured rigidly to the shaft $b$, as by a set screw $f'$, a sleeve $f$ which carries at one end a driving pulley $f^2$ and at the other end a disk $f^3$ which constitutes the rotatable member of the stopping devices and carries a stop-lug $f^4$. The latter is preferably secured to the disk in such manner, as by nicked or weakened screws $f^5$, as to be sheared off in the event of accidental engagement of the stopping devices at high speed and so prevent breakage of parts which cannot be as readily renewed as the stop-lug $f^4$.

Thus far the description applies equally to the embodiment of the invention shown in Figs. 1 and 7 and to that shown in Figs. 8 and 9, but the description which immediately follows will deal only with the embodiment of the invention shown in Figs. 1–7.

On the face of the disk $f^3$ is mounted a drum-wound armature $f^6$ with its commutator $f^7$. Series-wound field coils $f^x$ are supported by the shell $d$. The brushes $g'$ which coöperate with the commutator ring and are suitably supported in and insulated from the shell $d$, are connected, through suitable connectors indicated at $g^2$, with an electromagnet $g$ which is suitably supported by an insulated bracket $g^3$ on the shell $d$, preferably at its highest point.

Mounted on the shell $d$ so as to be radially movable is a block $h$ which forms the relatively stationary member of the stopping devices. The block is provided with a transverse pin $h'$ which may be engaged by the longitudinally movable cam-fork $k$ so as to be moved and held thereby radially out of the path of the rotating stop-lug $f^4$, to permit the machine to be operated. The cam-fork is under the control of the operator and for that purpose is carried by a grooved hub $k'$ mounted to slide freely on the sleeve $f$ and engaged by the forked end $m$ of a bell-crank lever $m'$ mounted on the shell $d$. An adjustable spring $m^2$ serves to hold the cam-fork normally in the position shown in Fig. 3, which is the position necessary to permit the engagement of the stop-lugs. The lever is also connected, as by a link $m^3$, with the controlling treadle by which the operator couples or uncouples the transmission through which the machine is driven. Pressure of the operator's foot on the treadle couples the transmission and moves the cam-fork from the position indicated in Fig. 3 to the position indicated by the position of the grooved hub $k'$ in Fig. 5, this movement lifting the radially movable block out of the path of the stop-lug $f^4$ and permitting the machine to operate. As soon as the machine attains its normal high speed, current is generated in the coils of the armature $f^6$ and the magnet $g$ is energized thereby to hold the movable block $h$ in its high position out of the path of the stop-lug $f^4$. As soon as the speed of the machine falls below that which has been predetermined for safe operation of the stopping devices, the current generated becomes insufficient to cause the magnet $g$ to hold the radially movable block in its upper position and such block therefore falls and moves into the path of the stop-lug $f^4$ thereby bringing the machine to rest with its parts in a predetermined position.

In the embodiment of the invention represented in Figs. 8 and 9, a magnet $g$ is supported by a bracket $g'$ on the shell $d$ and a radially movable block $h$ raised by the cam-fork $k$ is held in elevated position by the magnet $g$, when energized, out of the path of a stop-lug $f^4$ mounted on the rotating disk $f^3$, which is secured to the shaft $b$ through the sleeve $f$, all as previously described. The cam-fork $k$ is carried as before by the grooved hub $k'$ which is engaged by the forked arm of the bell-crank lever $m'$. The magnet $g$, however, instead of being energized from a generator carried by the rotating part of the stopping mechanism, is energized, when the circuit is closed, from an external source of electric energy indicated at $g^4$, one pole being connected to the frame of the machine and the other to the magnet $g$ and thence, through a connector $g^5$, to the shell $d$ which is insulated from the frame of the machine, as at $d^5$. The disk $f^3$ carries a second disk $f^8$ in which are mounted radially movable contacts $f^7$ arranged to complete the circuit from the frame to the shell $d$ by contact with the inner face of the shell, and so to bring about the energization of the magnet $g$. These contacts are mounted so as to be radially movable and are held normally retarded by springs $f^8$. Under the action of the centrifugal force developed at high speed the contacts $f^7$ move outwardly into contact with the interior of the shell $d$ and so close the circuit and bring about the energization of the magnet $g$ which then holds the movable block $h$ in its outward position out of the path of the stop-lug $f^4$, thus preventing the operation of the stopping devices when the machine is running above the speed predetermined to be safe for stopping.

It will be understood that various changes may be made in the details of construction and arrangement to suit different conditions of use and the convenience of the manufacturer without departing from the spirit of the invention.

I claim as my invention:

1. In a stopping mechanism, the combination of stopping devices, one of which is movable into and out of operative relation with the other, an electromagnetic device to hold said movable stopping device out of operative relation with the other, and means governed by the speed of the mechanism to determine the energization of the electromagnetic device.

2. In a stopping mechanism, the combination of a rotatable member having a stop-lug, a relatively stationary member, a block mounted on the relatively stationary member and movable into and out of operative relation with said stop-lug, an electromagnetic device to maintain the said block in inoperative relation, and means governed by the speed of the mechanism to determine the energization of the electromagnetic device.

3. In a stopping mechanism, the combination of a relatively stationary member, a rotatable member, a stop-lug carried by one of said members, a block carried by the other of said members and movable into and out of operative relation with said stop-lug, an electromagnetic device to retain said block in its inoperative position, and a generator connected to the magnetic device and having one of its parts mounted to rotate with the rotating member.

4. In a stopping mechanism, the combination of a relatively stationary member, a rotatable member, a stop-lug carried by one of said members, a block carried by the other of said members and movable into and out of operative relation with said stop-lug, an electromagnetic device to retain said block in its inoperative position, and a generator connected to the magnetic device and having one of its parts mounted to rotate with the rotating member, and means under the control of the operator to move the block out of operative relation with the stop-lug.

5. In a stopping mechanism, the combination of a relatively stationary member, a rotatable member, a stop-lug carried by the rotatable member, a block carried by the relatively stationary member and movable into and out of operative relation with the stop-lug, an electromagnetic device to retain said block in its inoperative position, and a generator connected with the magnetic device and having its armature mounted to rotate with the rotating member and its field coils mounted on the relatively stationary member.

6. In a stopping mechanism, the combination of stopping devices, one of which is relatively stationary to insure stopping with the parts in predetermined positions, and one of which is movable into and out of operative relation with the other, an electromagnetic device to hold said stopping device out of operative relation with the other, and means governed by the speed of the mechanism to determine the energization of the electromagnetic device.

This specification signed this 10th day of March, A. D. 1916.

GEORGE E. MOLYNEUX.

Copies of this patent may be obtained for five cents each, by addressing the "Commissioner of Patents. Washington, D. C."